(12) United States Patent
Wilhelmsson et al.

(10) Patent No.: US 10,368,369 B2
(45) Date of Patent: Jul. 30, 2019

(54) ALTERNATION BETWEEN COMMUNICATION USING CSMA/CA AND OFDMA

(71) Applicant: Telefonaktiebolaget LM Ericsson (publ), Stockholm (SE)

(72) Inventors: Leif Wilhelmsson, Dalby (SE); Thomas Nilsson, Malmo (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/735,239

(22) PCT Filed: Jun. 11, 2015

(86) PCT No.: PCT/EP2015/063037
§ 371 (c)(1),
(2) Date: Dec. 11, 2017

(87) PCT Pub. No.: WO2016/198105
PCT Pub. Date: Dec. 15, 2016

(65) Prior Publication Data
US 2018/0184449 A1    Jun. 28, 2018

(51) Int. Cl.
*H04W 74/02* (2009.01)
*H04W 72/04* (2009.01)
(Continued)

(52) U.S. Cl.
CPC ....... *H04W 74/02* (2013.01); *H04W 72/0453* (2013.01); *H04W 72/1215* (2013.01);
(Continued)

(58) Field of Classification Search
CPC ............. H04W 72/1215; H04W 74/02; H04W 74/0816; H04W 88/10; H04W 72/0453; H04W 72/02; H04W 74/006
See application file for complete search history.

(56) References Cited

U.S. PATENT DOCUMENTS

2009/0310692 A1* 12/2009 Kafle .................... H04L 5/0007
                                                  375/260
2011/0151861 A1    6/2011 Kim et al.
(Continued)

FOREIGN PATENT DOCUMENTS

EP    2693825 A1    2/2014
EP    2871901 A1 *  5/2015  ............ H04W 74/04
(Continued)

OTHER PUBLICATIONS

PCT International Search Report, dated Feb. 22, 2016, in connection with International Application No. PCT/EP2015/063037, all pages.
(Continued)

*Primary Examiner* — Mewale A Ambaye
(74) *Attorney, Agent, or Firm* — Leffler Intellectual Property Law, PLLC

(57) ABSTRACT

An access point (AP) uses a communication channel resource to communicate with first wireless communication devices using orthogonal frequency division multiple access (OFDMA) and with second wireless communication devices using carrier sense multiple access with collision avoidance (CSMA/CA). The AP alternates between OFDMA communication and CSMA/CA communication, and—during OFDMA communication—alternating between uplink and downlink communication. Each time period between an end of uplink communication and a start of downlink communication has a duration that is smaller than a time period threshold, and each time period between an end of downlink communication and a start of uplink communication has a duration that is smaller than the time period threshold. The time period threshold is smaller than or equal to a minimum time period required for any of the second wireless communication devices to acquire access to communication with the AP using CSMA/CA.

30 Claims, 2 Drawing Sheets

(51) Int. Cl.
*H04W 74/00* (2009.01)
*H04W 72/12* (2009.01)
*H04W 74/08* (2009.01)
*H04W 88/10* (2009.01)

(52) U.S. Cl.
CPC ..... *H04W 74/006* (2013.01); *H04W 74/0816* (2013.01); *H04W 88/10* (2013.01)

(56) References Cited

U.S. PATENT DOCUMENTS

| | | |
|---|---|---|
| 2013/0286959 A1 | 10/2013 | Lou et al. |
| 2014/0198705 A1 | 7/2014 | Porat et al. |
| 2015/0139091 A1* | 5/2015 | Azizi .................... H04L 5/0035 370/329 |

FOREIGN PATENT DOCUMENTS

| | | | |
|---|---|---|---|
| EP | 2871901 A1 | 5/2015 | |
| WO | 2012049533 A1 | 4/2012 | |
| WO | 2014051606 A1 | 4/2014 | |
| WO | WO-2014051606 A1 * | 4/2014 | ............ H04W 16/14 |
| WO | 2014179713 A1 | 11/2014 | |

OTHER PUBLICATIONS

PCT Written Opinion, dated Feb. 22, 2016, in connection with International Application No. PCT/EP2015/063037, all pages.
European Communication dated Jan. 3, 2019 in connection with European Application No. 15727995.1, 8 pages.

* cited by examiner

ALTERNATION BETWEEN COMMUNICATION USING CSMA/CA AND OFDMA

TECHNICAL FIELD

The present invention relates generally to the field of wireless communication. More particularly, it relates to enabling of alternation between communication using CSMA/CA and communication using OFDMA.

BACKGROUND

Two important standards for wireless communication are UMTS-LTE (Universal Mobile Telecommunication Standard, Long Term Evolution) advocated by 3GPP (Third Generation Partnership Project) and Wi-Fi (IEEE 802.11 series) advocated by IEEE (Institute of Electrical and Electronics Engineers).

UMTS-LTE supports communication by orthogonal frequency division multiple access (OFDMA), while current versions of the IEEE 802.11 standards (e.g. 802.11g, 802.11n, 802.11ac) operates based on carrier sense multiple access with collision avoidance (CSMA/CA).

In the current versions of the IEEE 802.11 standards, the channel access is typically distributed among the nodes (access point—AP, stations—STA) using the distributed coordination function (DCF), which means that all nodes contend for the channel when they have data to send.

In the next generation of Wi-Fi, denoted HEW (High Efficiency WLAN—Wireless Local Area Network) or 802.11ax, OFDMA is introduced to improve the performance in dense deployments. Since there is a huge number of legacy Wi-Fi devices on the market (e.g. basing their operation on any of the standard versions 802.11g, 802.11n, 802.11ac), it is desirable that the introduction of OFDMA be made to allow support also for legacy devices.

It should be noted that similar situations may occur in other scenarios than those of IEEE 802.11.

Therefore, there is a need for methods and arrangements that provide coexistence of OFDMA and CSMA/CA.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to solve or mitigate at least some of the above or other disadvantages.

In the description herein, we will use the term OFDMA also for communication between the access point and only one of the first wireless communication devices, even if this may not be the strictly correct term in such a scenario. Typically, all OFDMA aspects and examples referred to herein are mostly applicable when the two or more of the one or more first wireless communication devices are involved in simultaneous communication with the access point.

According to a first aspect, this is achieved by a method for an access point of a wireless communication network, wherein the access point is adapted to use a communication channel resource to communicate with a plurality of first wireless communication devices using orthogonal frequency division multiple access (OFDMA) and to communicate with a plurality of second wireless communication devices using carrier sense multiple access with collision avoidance (CSMA/CA). The communication channel resource comprises a bandwidth of frequencies dividable into a plurality of sub-carriers for OFDMA.

The method comprises alternating between communication using OFDMA and communication using CSMA/CA, and (during communication using OFDMA) alternating between uplink (UL) communication and downlink (DL) communication.

In the alternation between uplink communication and downlink communication, each time period between an end of uplink communication and a start of downlink communication has a duration that is smaller than a time period threshold, and each time period between an end of downlink communication and a start of uplink communication has a duration that is smaller than the time period threshold. The time period threshold is smaller than or equal to a minimum time period required for any of the second wireless communication devices to acquire access to communication with the access point using CSMA/CA.

For example, the first wireless communication devices may be devices operating in accordance with 802.11ax and the second wireless communication devices may be devices operating in accordance with any of 802.11g, 802.11n, and 802.11ac. In some situations, a wireless communication device may be both a first and second wireless communication device.

The minimum time period required for any of the second wireless communication devices to acquire access to communication with the access point using CSMA/CA may, for example, be equal to a length of a time period during which a node using CSMA/CA is to listen to the communication channel resource, and detecting inactivity thereon (i.e. detecting the channel as being free or idle), before using the communication channel resource for communication. Such a time period may, for example, equal a distributed coordination function (DCF) inter-frame space according to IEEE 802.11, or a DCF inter-frame space (DIFS) according to IEEE 802.11 plus a minimum value of a random time duration (RND) according to IEEE 802.11.

The value of the time period threshold may, for example, be equal to a short inter-frame space (SIFS) according to IEEE 802.11.

In some embodiments, a percentage of time used for the communication using OFDMA is based on a ratio of a number of first wireless communication devices associated with the access point to a sum of the number of first wireless communication devices associated with the access point and a number of second wireless communication devices associated with the access point.

In some embodiments, a percentage of time used for the communication using OFDMA is (alternatively or additionally) based on a ratio of a (possibly estimated) traffic need for communication between the access point and the one or more first wireless communication devices to a (possibly estimated) total traffic need for communication between the access point and the first and second wireless communication devices.

According to some embodiments, alternating between communication using OFDMA and communication using CSMA/CA may comprise acquiring access to the communication channel resource using CSMA/CA, determining to start the communication using OFDMA, transmitting a downlink packet for triggering one or more (or two or more) of the plurality of first wireless communication devices to perform the uplink communication using OFDMA, and (during the communication using OFDMA) alternating between the uplink communication and the downlink communication.

According to some embodiments, alternating between communication using OFDMA and communication using CSMA/CA may further comprise determining to end the communication using OFDMA, and refraining from downlink transmission to allow any of the second wireless communication devices to acquire access to the communication channel resource using CSMA/CA.

The downlink packet may comprise a control part and a payload part according to some embodiments.

The payload part may comprise content directed to the one or more of the plurality of first wireless communication devices. Content directed to a particular one of the first wireless communication devices may extend over one or more sub-carriers allocated to the particular first wireless communication device.

The control part may extend over all sub-carriers allocated to any particular first wireless communication device. The control part may comprise a first control part readable by the first wireless communication devices and by the second wireless communication devices and a second control part readable by the first wireless communication devices only.

The first control part may comprise synchronization information and the second control part may comprise an indication of the allocation of the one or more sub-carriers.

The method may, in some embodiments, further comprise (during communication using OFDMA) reserving one or more sub-carriers of at least part of the uplink communication for random access by any of the first wireless communication devices.

The part of the uplink communication may be based on the number of first wireless communication devices associated with the access point.

Alternatively or additionally, the part of the uplink communication may be based on a (possibly estimated and/or expected) traffic load of communication between the access point and the one or more first wireless communication devices.

The part of the uplink communication may be distributed in time according to a pre-determined pattern.

The method may comprise transmitting an indication of the reserved one or more sub-carriers to the first wireless communication devices.

In some embodiments, the method may further comprise receiving a random access message from one of the first wireless communication devices.

The random access message may be for allocation of sub-carriers.

In some embodiments, the random access message may also be indicative of an amount of data to be transmitted by the first wireless communication device.

Alternatively or additionally, the random access message may comprise the data itself if an amount of data to be transmitted by the first wireless communication device is smaller than a data amount threshold.

The data amount threshold may be dynamic or static. For example, a dynamic threshold may be set based on a current need for random access among the first wireless communication devices (e.g. high need, low threshold value and vice versa). The value of a dynamic threshold may, for example, be broadcast by the access point.

Alternatively or additionally to having one or more sub-carriers reserved for random access, the method may, in some embodiments, comprise (during communication using OFDMA) receiving an access request message from one of the first wireless communication devices, wherein the access request message indicates that the first wireless communication device has more content to transmit and is appended to data of the uplink communication by the first wireless communication devices.

The communication using OFDMA may be compliant with the IEEE 802.11ax standard and the communication using CSMA/CA may be compliant with, for example, any of the following standards: IEEE 802.11a, IEEE 802.11g, IEEE 802.11n and IEEE 802.11ac.

A second aspect is a computer program product comprising a computer readable medium, having thereon a computer program comprising program instructions. The computer program is loadable into a data-processing unit and adapted to cause the data-processing unit to execute the method according to the first aspect when the computer program is run by the data-processing unit.

A third aspect is an arrangement for an access point of a wireless communication network, wherein the access point is adapted to use a communication channel resource to communicate with a plurality of first wireless communication devices using orthogonal frequency division multiple access (OFDMA) and to communicate with a plurality of second wireless communication devices using carrier sense multiple access with collision avoidance (CSMA/CA) and wherein the communication channel resource comprises a bandwidth of frequencies dividable into a plurality of sub-carriers for OFDMA.

The arrangement comprising a controller adapted to cause the access point to alternate between communication using OFDMA and communication using CSMA/CA and (during communication using OFDMA) alternate between uplink communication and downlink communication.

In the alternation between uplink communication and downlink communication, each time period between an end of uplink communication and a start of downlink communication has a duration that is smaller than a time period threshold, and each time period between an end of downlink communication and a start of uplink communication has a duration that is smaller than the time period threshold. The time period threshold is smaller than or equal to a minimum time period required for any of the second wireless communication devices to acquire access to communication with the access point using CSMA/CA.

A fourth aspect is an access point comprising the arrangement according to the third aspect.

In some embodiments, the second, third and fourth aspects may additionally have features identical with or corresponding to any of the various features as explained above for the first aspect.

An advantage of some embodiments is that coexistence of OFDMA and CSMA/CA is provided for. Particularly, wireless communication devices capable of CSMA/CA but not of OFDMA may communicate with the same access point as wireless communication devices capable of OFDMA in a controlled manner.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where an access point is enabled to communicate with a plurality of first wireless communication devices using orthogonal frequency division multiple access (OFDMA) and to communicate with a plurality of second wireless communication devices using carrier sense multiple access with collision avoidance (CSMA/CA). This is enabled by using a bandwidth of frequencies common to the communication using OFDMA and communication using CSMA/CA, and alternating between communication using OFDMA and communication using CSMA/CA.

According to some embodiments, the access point determines the relation between the amounts of time spent in OFDMA based communication and CSMA/CA based communication based on the amount of first wireless communication devices in relation to the amount of second wireless communication devices.

An OFDMA session may be initiated by the access point by first acquiring access to the communication channel resource using CSMA/CA.

The OFDMA session is upheld by letting a duration of uplink/downlink and downlink/uplink switching (the time period between end of uplink communication and start of downlink communication and time period between end of downlink communication and start of uplink communication, respectably) having a duration that is smaller than a minimum time period required for acquiring access to communication with the access point using CSMA/CA, thereby hindering CSMA/CA based communication.

The OFDMA session may, for example, be ended by the access point refraining from downlink transmission, thereby leaving the bandwidth of frequencies unused for a duration of time that is at least as long as (or longer than) the minimum time period required for acquiring access to communication with the access point using CSMA/CA and, hence, enabling CSMA/CA based communication.

Wi-Fi (IEEE 802.11) will be used herein as an illustrative example of a scenario when embodiments are particularly applicable. This is, however, not to be considered as limiting. Contrarily, embodiments are equally applicable to any scenario where OFDMA and CSMA/CA is to coexist using the same (or overlapping) frequency bandwidth.

It should be noted that embodiments may be applicable also in scenarios where an access point initiates an OFDMA session by informing all wireless communication devices that CSMA/CA is not to be practiced during the duration of the OFDMA session. Such information may prevent CSMA/CA attempts of the wireless communication devices that receive the information, but a wireless communication device associating to the access point after the information has been conveyed may attempt CSMA/CA during the OFDMA session if no other measures are taken to prevent it. Such measures may comprise application of some embodiments described herein.

Figure 1A:
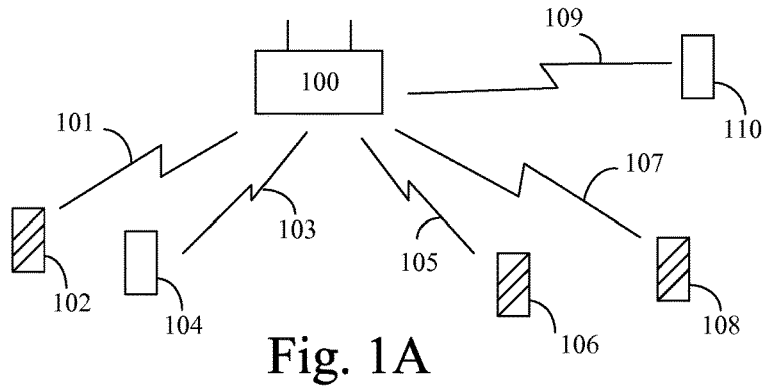
FIG. 1A is a schematic drawing illustrating an example scenario according to some embodiments.

FIG. 1A is a schematic illustration of an example scenario where some embodiments may be applicable. In this example scenario, an access point 100 is associated with a plurality of wireless communication devices 102, 104, 106, 108, 110 and communication between the access point and each of the wireless communication devices is enabled by radio links 101, 103, 105, 107, 109, respectively. The access point 100 may, for example, comprise arrangements and/or be adapted to perform methods according to any of the embodiments described herein.

In a typical example, the access point 100 is compliant with IEEE 802.11ax as well as earlier versions of the IEEE 802.11 standard (e.g. one or more of 802.11g, 802.11n, and 802.11ac), and some of the wireless communication devices (e.g. 102, 106, 108) are compliant with at least IEEE 802.11ax while the other wireless communication devices (e.g. 104, 110) are compliant only with earlier versions of the IEEE 802.11 standard (e.g. one or more of 802.11g, 802.11n, and 802.11ac) and not with IEEE 802.11ax.

Figure 1B:
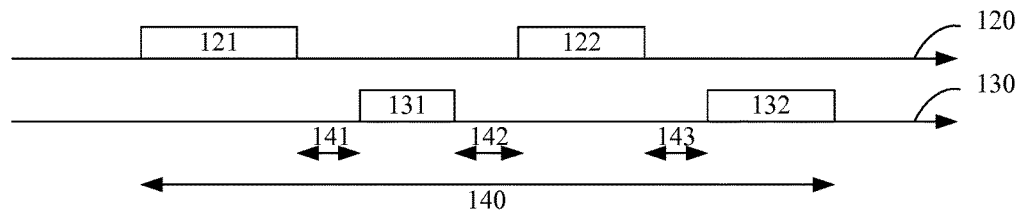
FIG. 1B is a schematic drawing illustrating an example OFDMA session according to some embodiments.

FIG. 1B illustrates an example OFDMA session 140 according to some embodiments. The OFDMA session 140 may, for example, be administered by the access point 100 of FIG. 1A.

The OFDMA session 140 is, typically, part of an alternation between OFDMA and CSMA/CA based communication. Hence, the OFDMA session 140 may be preceded by CSMA/CA based communication and the OFDMA session may commence by the access point acquiring access—via CSMA/CA—to a communication channel resource used by both the OFDMA and the CSMA/CA based communication. Alternatively or additionally, the OFDMA session 140 may be followed by CSMA/CA based communication and the OFDMA session may be terminated by the access point refraining from downlink communication to enable CSMA/CA based communication.

In FIG. 1B, downlink communication is illustrated by the time line 120 and uplink communication is illustrated by the time line 130.

During the OFDMA session 140, there is alternation between uplink communication 131, 132 and downlink communication 121, 122. In the alternation between uplink communication and downlink communication, each time period 142 between an end of uplink communication 131 and a start of downlink communication 122 has a duration that is smaller than a time period threshold, and each time period 141, 143 between an end of downlink communication 121, 122 and a start of uplink communication 131, 132 has a duration that is smaller than the time period threshold.

The time period threshold is chosen to prevent CSMA/CA communication to be initiated and is therefore smaller than or equal to a minimum time period required for acquiring access to communication with the access point using CSMA/CA.

The minimum time period required for acquiring access to communication with the access point using CSMA/CA may, for example, be equal to a length of a time period during which a node using CSMA/CA is to listen to the communication channel resource, and detecting inactivity thereon (i.e. detecting the channel as being free or idle), before using the communication channel resource for communication. Such a time period may, for example, equal the DIFS according to IEEE 802.11, or DIFS plus a minimum value of a random time duration (RND).

As mentioned above, the value of the time period threshold should be smaller than the minimum time period required for acquiring access to communication with the access point using CSMA/CA. A possible value of the time period threshold that is smaller than DIFS is the short inter-frame space (SIFS) according to IEEE 802.11.

Figure 2:
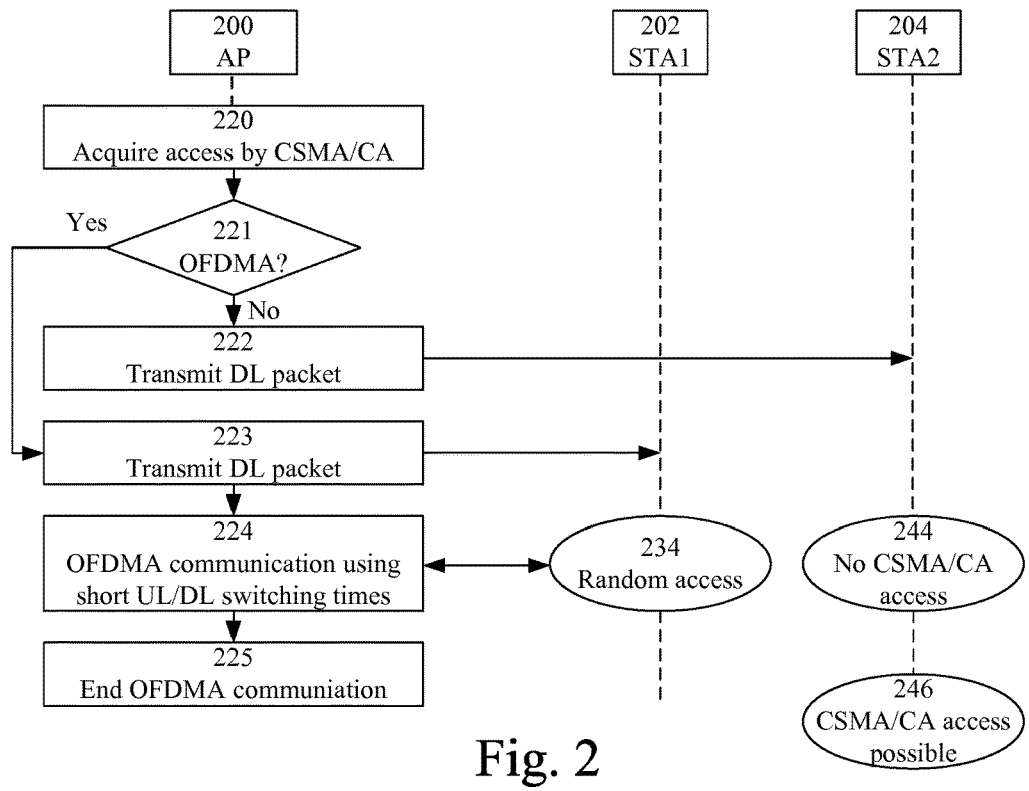
FIG. 2 is a flowchart illustrating example method steps according to some embodiments.

FIG. 2 illustrates an example method, according to some embodiments, of an access point (AP) 200 communicating with one or more first wireless communication devices (STAT) 202 using OFDMA and communicating with one or more second wireless communication devices (STA2) 204 using CSMA/CA. For example, the access point 200 may be the access point 100 of FIG. 1A, the first wireless communication devices 202 may be the wireless communication devices 102, 106, 108 of FIG. 1A and the second wireless communication devices 204 may be the wireless communication devices 104, 110 of FIG. 1A.

The access point 200 is adapted to use a communication channel resource to communicate with the first wireless communication devices 202 and with the second wireless communication devices 204. The communication channel resource comprises a bandwidth of frequencies dividable into a plurality of sub-carriers for OFDMA.

The method comprises alternating between communication using OFDMA and communication using CSMA/CA. In some embodiments, a percentage of time used for the communication using OFDMA is based on how many first and second wireless communication devices, respectively, are associated with the access point. In some embodiments, a percentage of time used for the communication using OFDMA is (alternatively or additionally) based on an estimated traffic need for communication between the access point and the one or more first wireless communication devices in relation to an estimated traffic need for communication between the access point and the one or more second wireless communication devices.

In step 220, the access point 200 acquires access to the communication channel resource using CSMA/CA and in step 221, the access point 200 determines whether to use OFDMA or not.

The determination may be based on the intended receiver of content to be transmitted by the access point. For example, if the access point has content (e.g. data or an acknowledgement message) directed to one of the second wireless communication devices, this content may be communicated using non-OFDMA methods (e.g. in accordance with earlier 802.11 versions as referenced above), and if the access point has content directed to one of the first wireless communication devices, this content may be communicated using OFDMA (e.g. in accordance with 802.11ax). If it is determined not to use OFDMA (No-path out from step 221), a downlink packet is transmitted to the relevant second wireless communication device 204 as indicted in step 222.

Alternatively or additionally, the determination may be based on a time elapsed since a previous OFDMA session (start and/or end of). For example, if there are an equal amount of first and second wireless communication devices, it may be reasonable to spend an half of the time in OFDMA sessions. Thus, if the time elapsed since the start of the previous OFDMA session is (approximately) twice the time elapsed since the end of the previous OFDMA session it may be determined to start an OFDMA session even if the access point does not have content directed to one of the first wireless communication devices. This approach allows the first wireless communication devices to use OFDMA for communication.

Alternatively or additionally, the determination may be based on an estimated current need for OFDMA based communication (e.g. the portion of wireless communication devices being OFDMA capable and/or the amount of data to be transmitted to/from these devices).

Numerous variations of the determination of step 221 may be envisioned within various embodiments.

If it is determined to use OFDMA (Yes-path out from step 221), a downlink packet (compare with 121 of FIG. 1B) is transmitted to one or more of the second wireless communication device 202 as indicted in step 223. The downlink packet may comprise content directed to one or more (or two or more) of the first wireless communication devices 202. Alternatively or additionally, it may be a downlink packet for triggering OFDMA communication by the one or more (or two or more) of the second wireless communication device 202. Thus, the downlink packet does not necessarily have any specific content directed to any, some or all of the first wireless communication devices 202.

The downlink packet transmitted in step 223 initiates an OFDMA session (compare with 140 of FIG. 1B), during which communication is altered between uplink and downlink communication.

In the alternation between uplink communication and downlink communication, the duration of the switching times (i.e. each time period between an end of uplink communication and a start of downlink communication and each time period between an end of downlink communication and a start of uplink communication—compare with 141, 142, 143 of FIG. 1B) are kept smaller than a time period threshold.

The time period threshold is smaller than or equal to a minimum time period required for any of the second wireless communication devices 204 to acquire access to communication with the access point using CSMA/CA.

The access point may ensure that the time period between an end of uplink communication and a start of downlink communication is below the time period threshold by appropriately starting downlink transmission in relation to an end of uplink reception. The access point may ensure that the time period between an end of downlink communication and a start of uplink communication is below the time period threshold by appropriately instructing (e.g. allocating time resources to) the first wireless communication devices to start uplink transmission in relation to an end of downlink transmission by the access point.

The OFDMA session is illustrated by step 224, and 244 indicates that the application of short switching times prevents access via CSMA/CA to the communication channel resource.

When it is determined that the OFDMA session is to be terminated (e.g. using similar considerations as described in step 221) as illustrated by step 225, the access point 200 may refrain from a downlink transmission to allow access via CSMA/CA to the communication channel resource as indicated by 246. Typically, the first wireless communication devices only transmit using OFDMA if allocated resources therefore by the access point. Thus, refraining from downlink transmission will implicitly halt all OFDMA communication in both uplink and downlink.

During the OFDMA session, the first wireless communication devices may be provided with means for random access in relation to the access point as illustrated by 234. Some example embodiments of the random access will be described in connection to FIG. 4.

Figure 3:
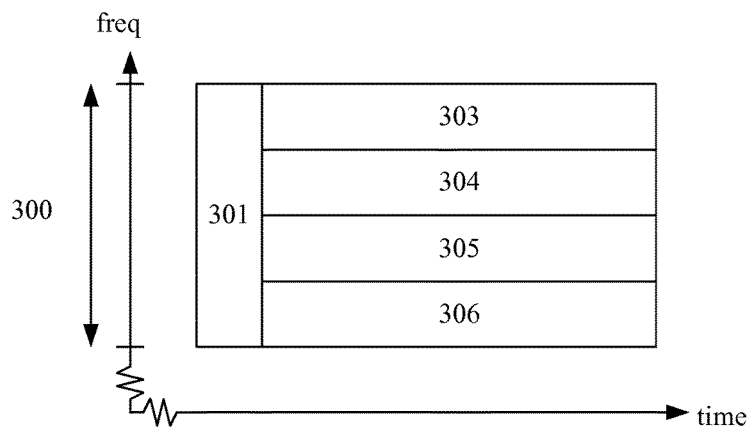
FIG. 3 is a schematic drawing illustrating an example uplink packet structure according to some embodiments.
Figure 4:
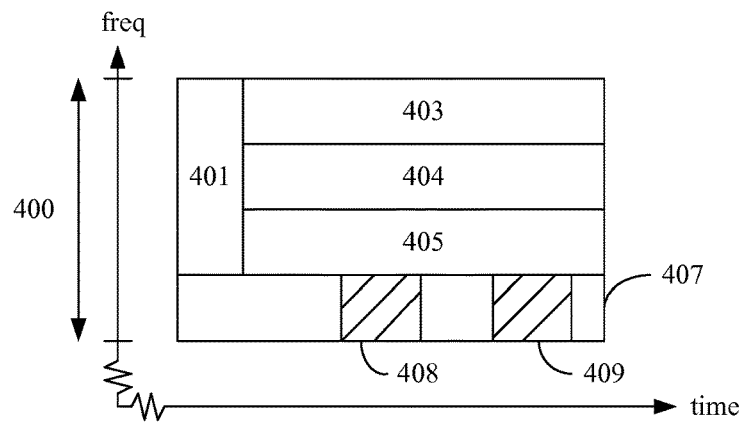
FIG. 4 is a schematic drawing illustrating an example uplink packet structure according to some embodiments.

FIGS. 3 and 4 illustrate example uplink packet structures for OFDMA communication according to some embodiments, wherein 300, 400 denote the bandwidth of frequencies of the communication channel resource.

The uplink packet structures of FIGS. 3 and 4 may, for example, be used for the uplink packets 131, 132 of FIG. 1B. In some embodiments, the packet structure, or details thereof, is determined by the access point and indicted to the relevant first wireless communication devices in a preceding downlink packet.

The example uplink packets comprise a control part 301, 401 and a payload part 303, 304, 305, 306, 403, 404, 405 according to some embodiments.

The payload part may comprise content from one or more of the plurality of first wireless communication devices. Content from a particular one of the first wireless communication devices extends over one or more sub-carriers allocated to the particular first wireless communication device, as illustrated by the different frequency regions 303, 304, 305, 306, 403, 404, 405 that may be used for content from different wireless communication devices.

The control part may extend over all sub-carriers used for the uplink packet, as illustrated by regions 301, 401.

The uplink packet may extend over all frequencies of the communication channel resource as illustrated by FIG. 3, or it may extend over only some of the frequencies of the communication channel resource as illustrated by FIG. 4 and leave some of the frequencies 407 (i.e. one or more sub-carriers) available for transmission of random access messages 408, 409 by any of the first wireless communication devices.

Uplink packets of the type illustrated by FIG. 3 and uplink packets of the type illustrated by FIG. 4 may be alternated in some embodiments. The alternation may follow a predetermined pattern or may be based on an estimated current need for random access (e.g. based on the amount of first wireless communication devices). The access point may transmit (e.g. broadcast) an indication of which sub-carriers are reserved for random access, and when (e.g. if the alternation does not follow a predetermined pattern).

A random access message 408, 409 may typically comprise (implicitly or explicitly) an identity of the wireless communication device transmitting the random access message and a request for allocation of sub-carriers. The random access message may also be indicative of an amount of data to be transmitted (i.e. an indication of the requested amount of resources).

Alternatively or additionally, the random access message may comprise actual data (or other content such as an acknowledgement message). This approach may be applied if the amount of data to be transmitted is smaller than a data amount threshold, which may be dynamic or static. For example, a dynamic threshold may be set based on an estimated current need for random access among the first wireless communication devices (e.g. high need, low threshold value and vice versa) and/or the length of a time duration of the uplink packet (e.g. threshold value equal to (part of) the packet length so that the random access message comprises the content if the content can be transmitted during the uplink packet transmission). Alternatively or additionally, the threshold value may depend on a quality-of-service required (e.g. high threshold for time critical data with low average throughput, and vice versa). The value of a dynamic threshold may be broadcast by the access point.

In some embodiments, a message indicating that a wireless communication device has more content to transmit (e.g. an access request message) may be appended (piggybacked) to an uplink communication by that wireless communication device. Such an approach renders a separate random access channel 407 unnecessary (at least for the wireless communication devices already allocated resources for uplink transmission) and may be used instead of or together with the uplink packet structure of FIG. 4.

Combinations of the approaches above may be envisioned. For example, an approach may comprise allocating random access resources by dynamically alternating the structures of FIGS. 3 and 4 wherein, if all first wireless communication devices can be scheduled in an uplink packet (e.g. if there are few of them), only the structure of FIG. 3 is used and any indication that a wireless communication device has more content to transmit is appended to an uplink communication.

In some embodiments, one or more sub-carriers are reserved—even during an OFDMA session—for communication based on CSMA/CA. Preferably, such sub-carriers covers at least a primary channel for CSMA/CA.

The packet structure of FIG. 3 may also be applicable to downlink packets for OFDMA communication according to some embodiments, wherein 300 denote the bandwidth of frequencies of the communication channel resource.

The downlink packet structure of FIG. 3 may, for example, be used for the downlink packets 121, 122 of FIG. 1B.

The example downlink packets comprise a control part 301 and a payload part 303, 304, 305, 306 according to some embodiments.

The payload part may comprise content directed to the one or more of the plurality of first wireless communication devices. Content directed to a particular one of the first wireless communication devices extends over one or more sub-carriers allocated to the particular first wireless communication device, as illustrated by the different frequency regions 303, 304, 305, 306 that may be used for content directed to different wireless communication devices.

The control part may extend over all sub-carriers used for the uplink packet, as illustrated by region 301. The control part may comprise a first control part (e.g. synchronization information) readable by all types of wireless communication devices and a second control part (e.g. sub-carrier allocation) readable by the first wireless communication devices only.

The control parts of the downlink packet may, for example, comprise field(s) for time- and frequency synchronization, field(s) for channel estimation, and control data (e.g. modulation and coding scheme, packet length, etc.). The control parts of the downlink packet may also comprise information about uplink sub-carrier allocation to respective user(s), which wireless communication devices have downlink data to receive and which sub-carries are used for the respective wireless communication devices in the downlink.

The content of the control parts is preferably self-contained in each sub-channel (i.e. each collection of sub-carriers used for a particular wireless communication device) and repeated in other sub-channels.

The first control part of the downlink packet may, for example, comprise the legacy short training field (L-STF), the legacy long training field (L-LTF), and the legacy signal field (L-SIG) for IEEE 802.11.

The second control part of the downlink packet may, for example, comprise OFDMA related control information, such as preamble, and 11ax long training field (LTF) for IEEE 802.11.

The payload part directed to a particular wireless communication device may be sent on one of a predetermined number of sub-channels, each comprising a predetermined number of sub-carriers. Alternatively, the number of sub-carriers allocated to a sub-channel may be varied to make scheduling more effective. In some embodiments, a sub-channel does not necessarily comprise only contiguous sub-carriers, but may comprise sub-carriers spread over part of or the entire bandwidth in order to provide for better frequency diversity.

Figure 5:
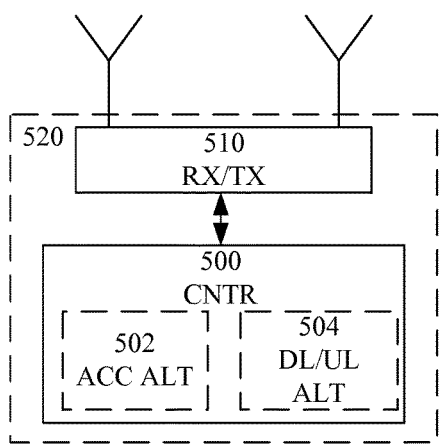
FIG. 5 is a block diagram illustrating an example arrangement according to some embodiments.

FIG. 5 illustrates an example arrangement 520 for an access point of a wireless communication network according to some embodiments. The arrangement 520 may for example be comprised in the access point 100 of FIG. 1A and/or may be adapted to perform the method of FIG. 2.

The access point comprising the arrangement 520 is adapted to use a communication channel resource to communicate with a plurality of first wireless communication devices using OFDMA and to communicate with a plurality of second wireless communication devices using CSMA/CA. The communication channel resource comprises a bandwidth of frequencies dividable into a plurality of sub-carriers for OFDMA.

The arrangement comprises a controller 500 adapted to cause the access point to alternate between communication using OFDMA and communication using CSMA/CA and (during communication using OFDMA) alternate between uplink communication and downlink communication, as described above.

To this end, the controller 500 may comprise an access type alternator (ACC ALT) 502 adapted to control the alternation between communication using OFDMA and communication using CSMA/CA (compare with steps 220, 221, 225 of FIG. 2) and an downlink/uplink alternator (DL/UL ALT) 504 adapted to control the alternation between uplink communication and downlink communication (compare with step 224 of FIG. 2).

In the alternation between uplink communication and downlink communication, each time period between an end of uplink communication and a start of downlink communication and each time period between an end of downlink communication and a start of uplink communication has a duration that is smaller than the time period threshold referred to above to prevent acquiring of access to communication using CSMA/CA.

The arrangement 520 may also comprise a transmitter and a receiver (here illustrated as a transceiver (RX/TX) 510) adapted to transmit downlink communication (e.g. downlink packets) and receive uplink communication (e.g. uplink packets, random access messages), respectively. The controller 500 may also be adapted to monitor the communication channel resource via the receiver 510 in the process of acquiring access to the communication channel resource using CSMA/CA.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as an access point or network node) comprising circuitry/logic or performing methods according to any of the embodiments.

Figure 6:
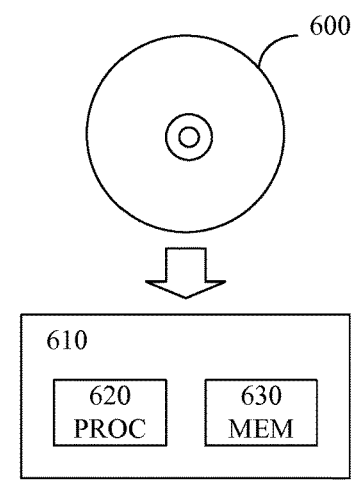
FIG. 6 is a schematic drawing illustrating a computer readable medium according to some embodiments.

According to some embodiments, a computer program product comprises a computer readable medium such as, for example, a USB-stick, a plug-in card, an embedded drive, or a CD-ROM (such as the CD-ROM 600 illustrated in FIG. 6). The computer readable medium may have stored thereon a computer program comprising program instructions. The computer program may be loadable into a data-processing unit (PROC) 620, which may, for example, be comprised in an access point 610. When loaded into the data-processing unit, the computer program may be stored in a memory (MEM) 630 associated with or integral to the data-processing unit. According to some embodiments, the computer program may, when loaded into and run by the data-processing unit, cause the data-processing unit to execute method steps according to, for example, the methods described above.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method for an access point of a wireless communication network, the method comprising:
the access point alternating between communication using orthogonal frequency division multiple access (OFDMA) and communication using carrier sense multiple access with collision avoidance (CSMA/CA); and
during communication using OFDMA, alternating between uplink communication and downlink communication, wherein
each time period between an end of uplink communication and a start of downlink communication has a duration that is smaller than a time period threshold,
each time period between an end of downlink communication and a start of uplink communication has a duration that is smaller than the time period threshold, and
the time period threshold is smaller than or equal to a minimum time period required for any of a plurality of second wireless communication devices to acquire access to communication with the access point using CSMA/CA,
wherein the access point is configured to use a communication channel resource to communicate with a plurality of first wireless communication devices using OFDMA and to communicate with the plurality of second wireless communication devices using CSMA/CA, wherein the communication channel resource comprises a bandwidth of frequencies dividable into a plurality of sub-carriers for OFDMA.

2. The method of claim 1 wherein a percentage of time used for the communication using OFDMA is based on a ratio of a number of first wireless communication devices associated with the access point to a sum of the number of first wireless communication devices associated with the access point and a number of second wireless communication devices associated with the access point.

3. The method of claim 1 wherein a percentage of time used for the communication using OFDMA is based on a ratio of a traffic need for communication between the access point and the one or more first wireless communication devices to a total traffic need for communication between the access point and the first and second wireless communication devices.

4. The method of claim 1, wherein alternating between communication using OFDMA and communication using CSMA/CA comprises:
  acquiring access to the communication channel resource using CSMA/CA;
  determining to start the communication using OFDMA;
  transmitting a downlink packet for triggering one or more of the plurality of first wireless communication devices to perform the uplink communication using OFDMA; and
  during the communication using OFDMA, alternating between the uplink communication and the downlink communication.

5. The method of claim 4, wherein alternating between communication using OFDMA and communication using CSMA/CA further comprises:
  determining to end the communication using OFDMA; and
  refraining from downlink transmission to allow any of the second wireless communication devices to acquire access to the communication channel resource using CSMA/CA.

6. The method of claim 4, wherein the downlink packet comprises a control part and a payload part, and wherein:
  the payload part comprises content directed to the one or more of the plurality of first wireless communication devices, wherein content directed to a particular one of the first wireless communication devices extends over one or more sub-carriers allocated to the particular first wireless communication device; and
  the control part extends over all sub-carriers allocated to any particular first wireless communication device, and comprises a first control part readable by the first wireless communication devices and by the second wireless communication devices and a second control part readable by the first wireless communication devices only.

7. The method of claim 6 wherein the first control part comprises synchronization information and the second control part comprises an indication of the allocation of the one or more sub-carriers.

8. The method of claim 1, further comprising, during communication using OFDMA, reserving one or more sub-carriers of at least part of the uplink communication for random access by any of the first wireless communication devices.

9. The method of claim 8 wherein the part of the uplink communication is based on the number of first wireless communication devices associated with the access point.

10. The method of claim 8 wherein the part of the uplink communication is based on a traffic load of communication between the access point and the one or more first wireless communication devices.

11. The method of claim 8, wherein the part of the uplink communication is distributed in time according to a predetermined pattern.

12. The method of claim 8, further comprising transmitting an indication of the reserved one or more sub-carriers to the first wireless communication devices.

13. The method of claim 8, further comprising receiving a random access message from one of the first wireless communication devices.

14. The method of claim 13 wherein the random access message is for allocation of sub-carriers and is indicative of an amount of data to be transmitted by the first wireless communication device.

15. The method of claim 13 wherein, if an amount of data to be transmitted by the first wireless communication device is smaller than a data amount threshold, the random access message comprises the data.

16. The method of claim 1, further comprising, during communication using OFDMA, receiving an access request message from one of the first wireless communication devices, wherein the access request message indicates that the first wireless communication device has more content to transmit and is appended to data of the uplink communication by the first wireless communication devices.

17. The method of claim 1, wherein the communication using OFDMA is compliant with the IEEE 802.11ax standard and the communication using CSMA/CA is compliant with any of the following standards: IEEE 802.11a, IEEE 802.11g, IEEE 802.11n and IEEE 802.11ac.

18. A non-transitory computer readable medium, having thereon a computer program comprising program instructions, the computer program being loadable into a data-processing unit and adapted to cause execution of a method when the computer program is run by the data-processing unit, wherein the method is for an access point of a wireless communication network, the method comprising:
  the access point alternating between communication using orthogonal frequency division multiple access (OFDMA) and communication using carrier sense multiple access with collision avoidance (CSMA/CA); and
  during communication using OFDMA, alternating between uplink communication and downlink communication, wherein
  each time period between an end of uplink communication and a start of downlink communication has a duration that is smaller than a time period threshold,
  each time period between an end of downlink communication and a start of uplink communication has a duration that is smaller than the time period threshold, and
  the time period threshold is smaller than or equal to a minimum time period required for any of a plurality of second wireless communication devices to acquire access to communication with the access point using CSMA/CA,
  wherein the access point is configured to use a communication channel resource to communicate with a plurality of first wireless communication devices using OFDMA and to communicate with the plurality of second wireless communication devices using CSMA/CA, wherein the communication channel resource comprises a bandwidth of frequencies dividable into a plurality of sub-carriers for OFDMA.

19. An arrangement for an access point of a wireless communication network, the arrangement comprising a controller adapted to cause the access point to:
- alternate between communication using orthogonal frequency division multiple access (OFDMA) and communication using carrier sense multiple access with collision avoidance (CSMA/CA); and
- during communication using OFDMA, alternate between uplink communication and downlink communication, wherein
- each time period between an end of uplink communication and a start of downlink communication has a duration that is smaller than a time period threshold,
- each time period between an end of downlink communication and a start of uplink communication has a duration that is smaller than the time period threshold, and
- the time period threshold is smaller than or equal to a minimum time period required for any of a plurality of second wireless communication devices to acquire access to communication with the access point using CSMA/CA,
- wherein the access point is configured to use a communication channel resource to communicate with a plurality of first wireless communication devices using OFDMA and to communicate with the plurality of second wireless communication devices using CSMA/CA, wherein the communication channel resource comprises a bandwidth of frequencies dividable into a plurality of sub-carriers for OFDMA.

20. The arrangement of claim 19 wherein a percentage of time used for the communication using OFDMA is based on a ratio of a number of first wireless communication devices associated with the access point to a sum of the number of first wireless communication devices associated with the access point and a number of second wireless communication devices associated with the access point.

21. The arrangement of claim 19 wherein a percentage of time used for the communication using OFDMA is based on a ratio of an estimated traffic need for communication between the access point and the one or more first wireless communication devices to an estimated total traffic need for communication between the access point and the first and second wireless communication devices.

22. The arrangement of claim 19, wherein the controller is adapted to cause the access point to alternate between communication using OFDMA and communication using CSMA/CA by:
- acquiring access to the communication channel resource using CSMA/CA;
- determining to start the communication using OFDMA;
- transmitting a downlink packet for triggering one or more of the plurality of first wireless communication devices to perform the uplink communication using OFDMA; and
- during the communication using OFDMA, alternating between the uplink communication and the downlink communication.

23. The arrangement of claim 22 wherein the controller is further adapted to cause the access point to alternate between communication using OFDMA and communication using CSMA/CA by:
- determining to end the communication using OFDMA; and
- refraining from downlink transmission to allow any of the second wireless communication devices to acquire access to the communication channel resource using CSMA/CA.

24. The arrangement of claim 19, wherein the controller is further adapted to cause the access point to, during communication using OFDMA, reserve one or more sub-carriers of at least part of the uplink communication for random access by any of the first wireless communication devices.

25. The arrangement of claim 24 wherein the controller is further adapted to base the part of the uplink communication on the number of first wireless communication devices associated with the access point.

26. The arrangement of claim 24 wherein the controller is further adapted to base the part of the uplink communication on a traffic load of communication between the access point and the one or more first wireless communication devices.

27. The arrangement of claim 24, wherein the controller is further adapted to distribute the part of the uplink communication in time according to a pre-determined pattern.

28. The arrangement of claim 24, wherein the controller is further adapted to cause the access point to transmit an indication of the reserved one or more sub-carriers to the first wireless communication devices.

29. The arrangement of claim 19, wherein the communication using OFDMA is compliant with the IEEE 802.11ax standard and the communication using CSMA/CA is compliant with any of the following standards: IEEE 802.11a, IEEE 802.11g, IEEE 802.11n and IEEE 802.11ac.

30. An access point comprising the arrangement according to claim 19.

* * * * *